A. L. SYKES.
COOKING APPLIANCE.
APPLICATION FILED MAY 16, 1910.
1,005,357.
Patented Oct. 10, 1911.
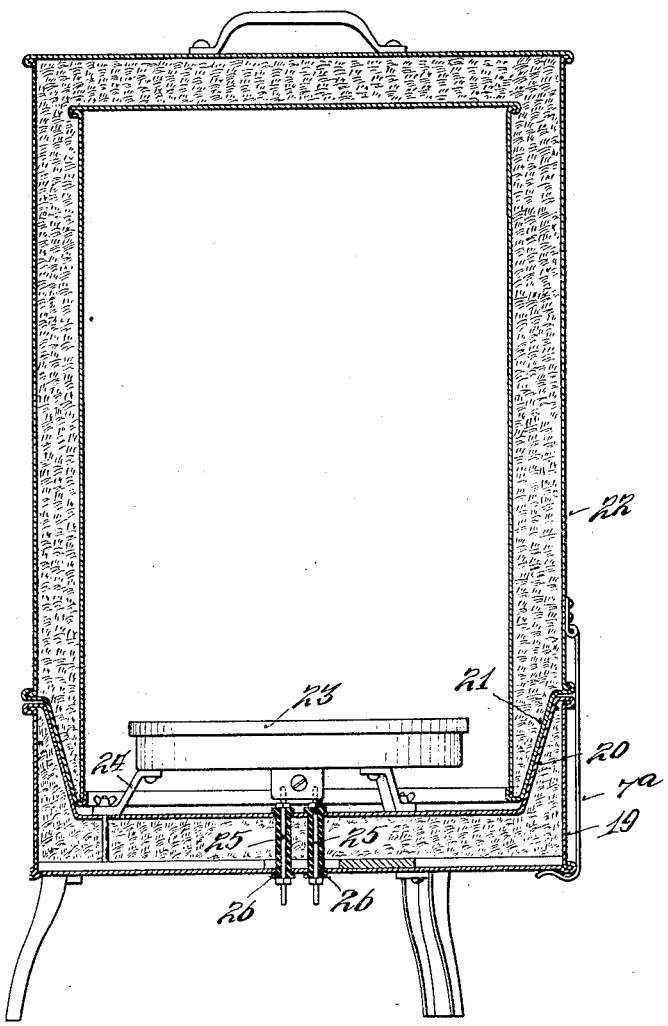
Witnesses
Oliver B. Kaiser
Inventor
Alexander L. Sykes
By Wood & Wood
Attorneys

UNITED STATES PATENT OFFICE.

ALEXANDER L. SYKES, OF COVINGTON, KENTUCKY, ASSIGNOR TO THE A. L. SYKES MANUFACTURING COMPANY, OF CINCINNATI, OHIO, A CORPORATION OF OHIO.

COOKING APPLIANCE.

1,005,357.  Specification of Letters Patent.  Patented Oct. 10, 1911.

Application filed May 16, 1910. Serial No. 561,547.

*To all whom it may concern:*

Be it known that I, ALEXANDER L. SYKES, a citizen of the United States, residing at Covington, in the county of Kenton and State of Kentucky, have invented certain new and useful Improvements in Cooking Appliances, of which the following is a specification.

My invention relates to an improvement in appliances for the storage of victuals and maintaining the same in either a heated or cooled condition according to the nature of its usage, primarily comprising a double walled vessel, with insulating material between the walls, and a removable cap or cover of like construction, thereby forming an intermediate compartment for the preservation of cooked victuals or completing the cooking thereof when inserted in a partially uncooked heated state. The use of supplemental heating means is also provided to supply the necessary heat for completely cooking, or to maintain the contents warm or hot, or in a cooled state by the use of a refrigerant.

One of the objects of my invention is to provide a cooking appliance of two-part form, with their connecting ends relatively tapered and telescopically engaged with each other, in which the base portion is preferably of shallow formation, and provided with a heating appliance, preferably an electric-heater, whereby the same can be used for initial heating or cooking, and the appliance maintained in an open condition.

Another object of my invention is to provide a combined heater and fireless cooking appliance, comprising a base portion, forming a shallow vessel adapted to receive a cover of larger inner area, both of which are of double-wall formation, with insulating material between said walls.

The various other features of my invention are more fully set forth in the description of the accompanying drawing, forming a part of this specification, in which the figure is a central vertical section through my improved cooking vessel.

19 represents the base of the cooker, and 22 the cover therefor, preferably cylindrical in form. The base 19 is of double-wall formation the intermediate jacket space of which is filled with insulating material. The base is provided with the tapering edge 20 at the open end thereof, adapted to telescopically engage into a relatively tapering wall 21, of the cover 22, hermetically sealing the mouth of the vessel in pressing the tapering portions of base and cover together, until they frictionally bind around their entire periphery. This form of joint provides a considerable area of closing surface, and destroys the radiation of heat from the interior to the exterior of the cooker, or vice versa, and is as efficient as a non-conductor of heat as the major portion of the cooker. The cover is similarly constructed as the base with double-walls and intermediate jacket space filled with insulating material.

7ª represents cover clamping hooks hinged to the cover, adapted to be clasped over the bottom or lower wall of the body to clamp the cover under tension upon the base, thereby forming convenient and quick means in removing or applying the cover.

The mouth of the base being of the same diameter as the interior thereof, enables the same to be conveniently cleaned and maintained in an absolutely sanitary condition.

23 represents an electric heater, of commercial type, provided with the legs 24, detachably connected within the body 19.

25 represents electric conductor rods secured within the insulator sleeves 26, which sleeves in turn project through and are secured to the two walls of the base. One end of said conductor rods, having a socket connection with the electric heater, while the opposite ends are adapted to receive a socket connection for connecting the heater with the source of electrical supply. By this construction, the heater 23 is readily removable from the base, for sanitary purposes, without disturbing the conductor rods 25.

It is obvious that the nested or single cooking utensils may be placed upon the heater, as is the usual practice in this class of fireless cookers.

Many advantages are obtained by this form of cooking appliance, as all the uses of a fireless cooker are embodied, together with the utilization of the base for initial cooking and uses common to the commercial type of electric cooking appliance.

The advantages of a fireless cooker or storage vessel, constructed as above described, are many, in that a neat, compact and portable appliance is provided.

Having described my invention, I claim:—

In a cooking appliance, a base of shallow vessel form, an elongated cover therefor, said base and cover being each of double-wall formation with insulating material intermediate thereof, and adapted to telescopically engage with each other, in combination with an electric heater supported within said base, and conductor means fixed to and projected through said base and insulated therefrom, providing interior and exterior terminals for said heater.

In testimony whereof, I have hereunto set my hand.

ALEXANDER L. SYKES.

Witnesses:
 OLIVER B. KAISER,
 LOUISE A. BECK.